Oct. 3, 1944. J. T. BEECHLYN 2,359,293
PERMANENT MAGNETIC CHUCK
Filed Aug. 20, 1942   2 Sheets-Sheet 1
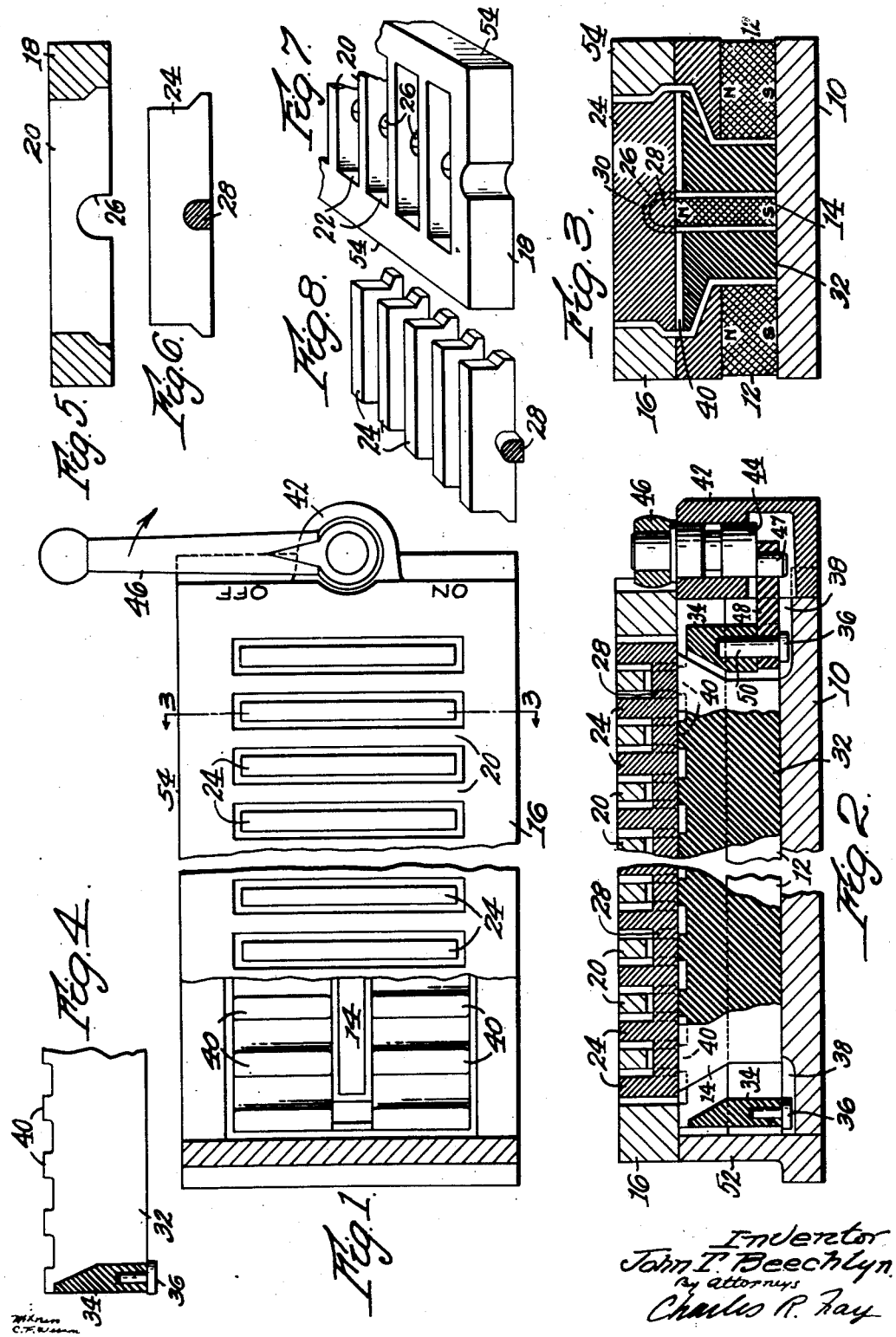
Inventor
John T. Beechlyn
by attorneys
Charles R. Fay

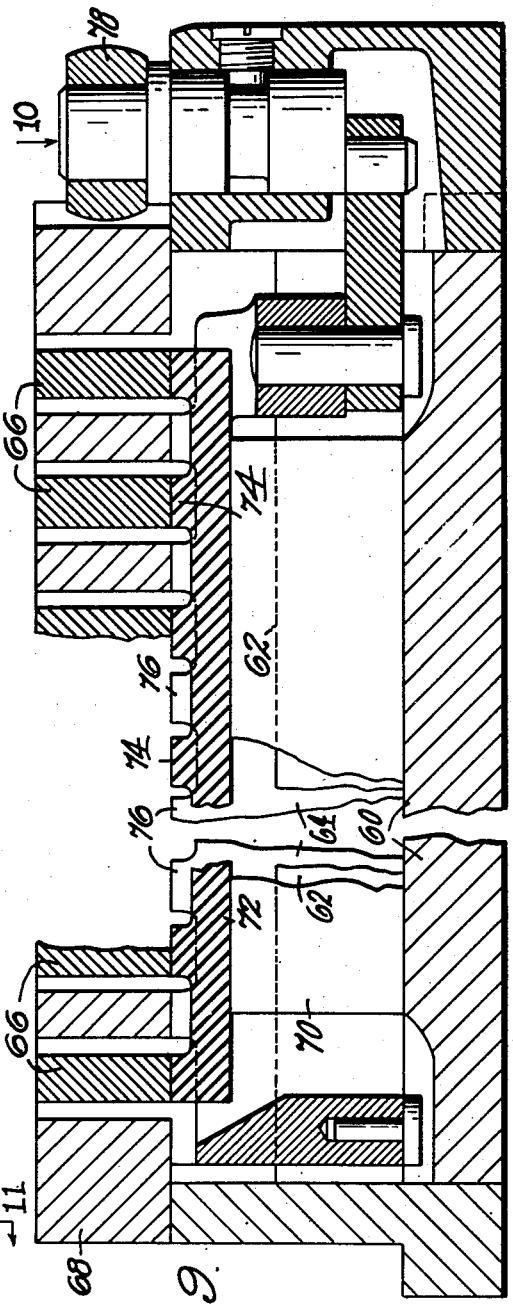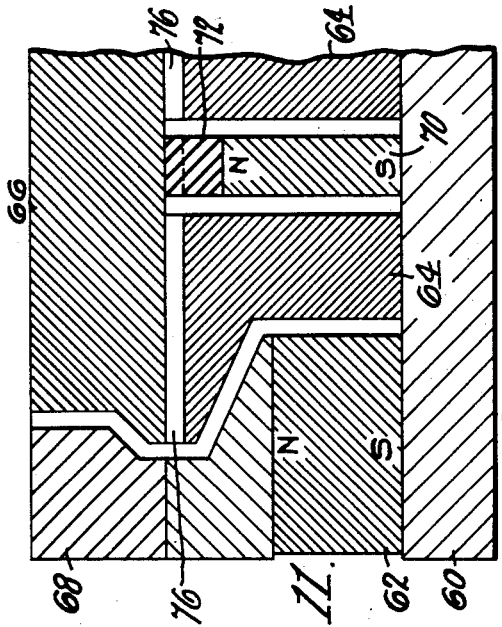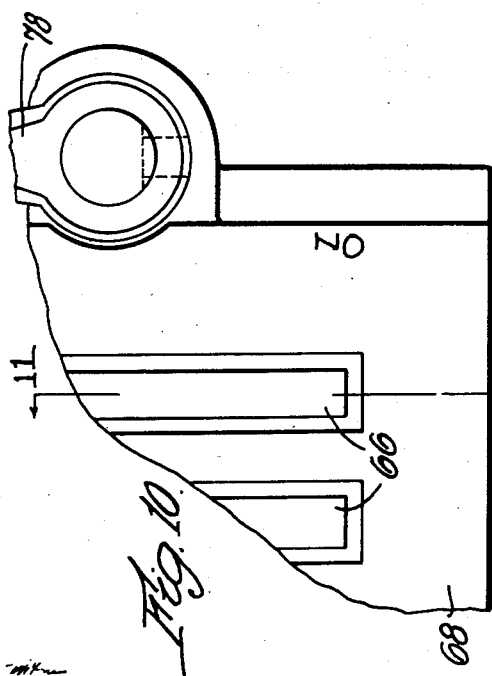

Patented Oct. 3, 1944

2,359,293

UNITED STATES PATENT OFFICE 2,359,293

PERMANENT MAGNETIC CHUCK

John T. Beechlyn, Worcester, Mass., assignor to O. S. Walker Co. Inc., Worcester, Mass., a corporation of Massachusetts Application August 20, 1942, Serial No. 455,495

8 Claims. (Cl. 175—367)

This invention relates to permanent magnet chucks and involves constructions using fixed magnets in combination with means for providing a reversal flux of relatively small volume for work release as well as providing a comparatively large holding flux.

Objects of the invention include the provision of a permanent magnet chuck having a plurality of fixed parallel bar-type magnets located below and parallel to a top plate and being magnetized to present like poles adjacent the top plate and the opposite poles adjacent an iron bottom plate, there being an iron member which is movable with relation to the magnets and top plate and cooperating with the latter to cause the major part of the flux to traverse a work piece on the top plate or selectively to cause a minor part of the flux to traverse the work piece in the opposite direction while at the same time directing said major part through an alternate path to exclude it from the work piece.

Further objects of the invention include the provision of a permanent magnet chuck in which all the magnets also act as structural supporting members in fixed relation to the body of the chuck, one magnet being located in a central plane of the chuck and rigidly supporting the top plate centrally longitudinally thereof at its point of greatest flexure to prevent such flexure and consequent binding of the top plate, said central magnet being of a lesser flux magnitude than the others and having the function of providing a reversal work release flux upon proper actuation of an iron flux control member; and the provision of a practical, efficient permanent magnet chuck which is simple in construction and easily lends itself to production manufacture.

Other objects and advantages will appear hereinafter.

Reference is to be had to the accompanying drawings, in which

Fig. 1 is a top plan view of a chuck embodying one form of the invention, parts being broken away;

Fig. 2 is a central vertical section taken through the chuck of Fig. 1;

Fig. 3 is a section on line 3—3 of Fig. 1;

Fig. 4 is a partial view of one end of the flux control member;

Fig. 5 is a transverse section through the top plate grid;

Fig. 6 is a front elevation of a pole piece;

Fig. 7 is a perspective view of the top plate grid;

Fig. 8 is a perspective view of the pole pieces;

Fig. 9 is an enlarged central vertical section of a modified form of the invention;

Fig. 10 is a partial plan view of the chuck of Fig. 9; and

Fig. 11 is a section on line 11—11 of Fig. 10.

In the embodiment of the invention disclosed in Figs. 1 to 8 inclusive there is shown a soft iron bottom plate 10 which is preferably rectangular in form and rigidly supports a pair of parallel bar magnets 12, these magnets being widely spaced and located along the opposite edges of the bottom plate. Arranged longitudinaly of and centrally of the bottom plate, there is a comparatively tall narrow magnet 14 which also rests on the bottom plate and is fixed thereto. The magnet 14 extends upwardly, see Fig. 3, to aid in supporting a top plate 16. This top plate comprises a highly permeable soft iron grid 18 having integral cross bars 20 which form rectangular apertures 22 for the reception of iron pole pieces 24. The bars 20 are each provided with a central, rounded aperture 26 in its lower surface, these apertures providing for reception of a bar 28 which extends transversely of the pole pieces 24 integrally or in intimate contact therewith, and magnetically connects the pole pieces. It will be noted that the section of bar 28 is less in area than the area of the apertures 26, see Fig. 3, and the difference in areas is taken up by a non-magnetic material, such as for instance lead or type metal 30, forming a magnetic gap. The pole pieces 24 are of a smaller extent than apertures 22, and the space between the pole pieces and the bars of grid 18 may be filled with a non-magnetic material. This construction provides a unitary top plate extending substantially the length of the device and having magnetic insulation between the pole pieces and grid 18 so that a magnetic work holding surface is formed. However, all the pole pieces are magnetically connected together as by the bar 28 for a purpose to be described.

The bottom plate 10 slidably supports an elongated soft iron member 32 which may be slotted centrally throughout its length or made in divided form to accommodate the central magnet 14 in spaced condition relative thereto and to magnets 12. The ends of the sliding member 32 may be connected as at 34, beyond the ends of the central magnet 14, and rollers 36 are mounted in the end connections 34 for slidable reception in slots 38 in the top surface of the bottom plate. These rollers will prevent any lateral movement of the iron member 32 during its sliding movement so that the spaced relation of the iron member from magnets 12 and 14 will be continuously maintained to prevent any undesired short circuiting of any of the magnets.

The top surfaces of both parts of iron member 32 are provided with spaced tooth-like projections 40 which are arranged parallel to bars 20 and pole pieces 24, and these teeth are of a width and spacing to provide magnetic contact with either the pole pieces 24 or bars 20, but this contact will be mutually exclusive. It will be noted that the iron member 32 is generally T-shaped in order to provide a full contact with pole pieces 24.

As is clearly shown in Fig. 2, iron member 32 is longer than the central magnet 14, so that the former may be slidably reciprocated relative to this magnet while surrounding it, whereby teeth 40 will coincide exactly with pole pieces 24 at one limit of movement of the iron member and with bars 20 at the other limit thereof.

At one end of the device there is arranged a housing 42 which may be secured in any convenient manner to the device, this housing rotatably supporting a circular disc 44 which is provided with a handle 46 for rotating disc 44 between the "on and off" positions, 180° apart as shown in Fig. 1. Disc 44 mounts an eccentric pin 47 connected by a link 48 to a pin 50 in one end of iron member 32. It is obvious that by moving handle 46 throughout its range, iron member 32 will be moved from one limit of its movement to the other.

An end plate 52 may be provided to close one end of the device and the housing 42 may embody an end plate to close the other end of the device, it being particularly noted that the unitary top plate 16 extends substantially from one end to the other of the holder; there being no parts which extend above the top plate, handle 46 being movable only in a horizontal plane below the working surface of the top plate.

With handle 46 in the "off" position as shown in the drawings, iron member 32 will be located at its left hand position as shown in Fig. 2, teeth 40 of the iron member thus contacting and thereby connecting the bottom plate 10 with bars 20 of grid 18, so that the top plate grid is directly magnetically connected with the bottom plate, and pole pieces 24 are magnetically disconnected therefrom. In this situation it will be clear that the flux from magnets 12 will be provided with a closed iron circuit comprising the lateral side elements 54 of grid 18, bars 20, teeth 40, iron member 32, and base plate 10, there being no gaps in this circuit. Regardless of whether a work piece bridges the gaps in the top plate, the major flux to be derived from the magnetic sources will not pass through the work, but on the contrary will be contained substantially wholly within the body of the device. However, flux from magnet 14 will be directed into pole pieces 24, due to bar 28, which is in constant and fixed magnetic communication with this magnet, and this flux will pass therefrom into the work piece, traversing the same to enter grid side elements 54, passing therefrom through teeth 40, iron member 32 and bottom plate 10. The direction of the flux from magnet 14 will therefore merge with and progress, in iron member 32, in the same direction as the flux from magnets 12.

Handle 46 now being moved to the "on" position, teeth 40 will contact pole pieces 24 and will thus connect these pole pieces directly to the bottom plate, while at the same time disconnecting all the parts of grid 18 from the bottom plate. Now flux from magnets 12 must traverse the gaps in the top plate and pass through a work piece thereon in a direction opposite to the former direction of the flux previously passing through the work piece from magnet 14. Since pole pieces 24 are now magnetically connected to the base plate, flux from magnet 14 will be diverted from the work piece and will pass directly from pole pieces 24 into iron member 32 to the base plate.

It will be clear from the above described construction and operation of the device that a relatively powerful holding flux is provided for a work piece spanning a gap in the top plate, and that selectively a less powerful reversal flux will be provided through the work piece when the handle is in off position. At the same time, all the magnets are fixed, rigid structural members which are fixed in position and hold the top plate in a secure fixed relation to the bottom plate and the slidable iron member 32, and no members move against or in contact with any magnet. Magnet 14 is disposed centrally longitudinally of the device and thus will rigidly support the top plate at its point of greatest flexure. Hence there will be no possibility of binding on the movable flux control member 32.

A modification of the invention is shown in Figs. 9 to 11 inclusive wherein base plate 60 is the same as the base plate 10, magnets 62 are equivalent to magnets 12 and the soft iron double or slotted sliding flux control element 64 is substantially the same as element 32. However in the case of Figs. 9 to 11, pole pieces 66, although magnetically separated from grid 68, are not connected as by bar 28 but are completely separate. However, central magnet 70 is not quite as tall as magnet 14 and it is fixedly secured between the base plate and pole pieces 66 by means of a toothed iron bar 72 which is provided with teeth 74 which are arranged to be in fixed contact with the pole pieces 66.

The slidable iron flux control member 64 is provided with teeth 76 equivalent to the teeth 40 on the iron member 32, and flux control member 64 is operated similarly to member 32 by means of a handle 78.

The operation of the device disclosed in Figs. 9 to 11 inclusive is similar to the description of operation as above recited in the embodiment shown in Figs. 1 to 8. In both instances the top plate may be made as a unit and its work surface is never impeded by any part of the mechanism. In both cases a powerful holding flux is obtained from the edge magnets 12 and 62, and in both cases a similar reversal is provided by the central magnet for efficient work release. Also in both cases the magnets provide support for the top plate, and the central magnet is disposed in a position to prevent flexure of the top plate at its point of greatest flexure or vibration.

Having thus described my invention and the advantages thereof, I do not wish to be limited to the details herein disclosed, otherwise than as set forth in the claims, but what I claim is:

1. In a device of the class described, a ferric bottom plate, a top plate, a series of pole pieces in the top plate magnetically spaced therefrom to form a work surface, a plurality of magnets between the bottom and top plates, said magnets being of the bar type and lying generally parallel to each other and to the bottom and top plates, means fixing said magnets with relation to the bottom and top plates, and a movable ferric non-coercive member adapted to selectively connect and disconnect said bottom plate and pole pieces, said member being in substantial sliding contact with both the top plate and bottom plate.

2. In a device of the class described, a ferric bottom plate and a ferric top plate comprising a grid, pole pieces in said top plate grid magnetically spaced therefrom to provide a magnetic holding surface, means spacing said plates, said means comprising at least two spaced and fixed bar magnets, a non-coercive, and ferric member slidably arranged between and contacting both the plates and effective to selectively and exclusively connect said pole pieces or grid with said bottom plate.

3. In a device of the class described, a top plate comprising a grid, pole pieces in said grid and magnetically spaced therefrom to form a holding surface, a bottom plate of soft iron spaced from the top plate, a pair of spaced magnets fixed to and between the plates and supporting the top plate, said magnets being polarized to present like poles towards the top plate, an iron flux control member movably mounted between the top plate and bottom plate to magnetically connect said plates, and means on the member effective to selectively magnetically connect either said pole pieces or said grid to said bottom plate to the substantial exclusion of the other, and means directly and fixedly magnetically connecting one magnet only to said pole pieces.

4. In a device of the class described, a pair of ferric members magnetically separated to form a top plate having a magnetic holding surface, a ferric bottom plate, a pair of magnets rigidly fixed on the bottom plate and supporting the top plate in fixed relation thereto, one magnet having fixed magnetic connections with the bottom plate and with one member only, and the other magnet having fixed magnetic connections with the base and the other member only, and a movable non-coercive ferric flux control element having a continuous magnetic contact with the bottom plate, said element having means effective to selectively magnetically contact either of said ferric members.

5. A device of the class recited in claim 4 wherein said magnets are spaced from each other and said flux control element is spaced from the magnets.

6. In a device of the class described, a top plate comprising at least two magnetically insulated ferric members forming a holding surface, a ferric bottom plate, at least two bi-polar magnets fixedly secured to the top and bottom plates, said magnets being mechanically free of the device otherwise, both magnets having like poles in magnetic communication with the bottom plate, one magnet having its other pole in fixed magnetic communication with one of said ferric members, the other magnet having its other pole in fixed magnetic communication with the other ferric member, a non-coercive ferric flux control element slidably mounted on the bottom plate and in sliding contact with the top plate, and means on said element to magnetically connect the same with either one member or the other selectively, depending on the position of the element.

7. A device of the class recited in claim 6 wherein said magnets are magnetically spaced between their poles from the ferric flux control element.

8. A device of the class recited in claim 6 wherein the flux control element is spaced from both magnets.

JOHN C. BEECHLYN.